United States Patent [19]

Shiba

[11] Patent Number: 5,719,711
[45] Date of Patent: Feb. 17, 1998

[54] THERMOPLASTIC LENS BARREL FOR HOLDING ASSEMBLY OF LENS ELEMENTS

[75] Inventor: Sukenori Shiba, Tokyo, Japan

[73] Assignee: Asahi Kogaku Kogyo Kabushiki Kaisha, Tokyo, Japan

[21] Appl. No.: 703,662

[22] Filed: Aug. 27, 1996

[30] Foreign Application Priority Data

Aug. 28, 1995 [JP] Japan .................. 7-242512

[51] Int. Cl.⁶ .................................................. G02B 7/02
[52] U.S. Cl. ................. 359/819; 359/820; 359/523; 396/71; 396/448; 396/530
[58] Field of Search ...................... 359/819, 820, 359/823; 396/71, 448, 530, 535

[56] References Cited

U.S. PATENT DOCUMENTS

| | | | |
|---|---|---|---|
| 3,578,847 | 5/1971 | Grey | 359/823 |
| 3,784,287 | 1/1974 | Grey | 359/819 |
| 4,668,048 | 5/1987 | Amberg et al. | 359/820 |
| 4,942,414 | 7/1990 | Takahashi et al. | 396/71 |
| 5,016,032 | 5/1991 | Haraguchi et al. | 396/448 |
| 5,052,781 | 10/1991 | Iizuka | 359/823 |
| 5,097,280 | 3/1992 | Nomura | 396/530 |
| 5,177,641 | 1/1993 | Kobayashi | 359/820 |
| 5,301,066 | 4/1994 | Higuchi et al. | 359/823 |

*Primary Examiner*—Loha Ben
*Attorney, Agent, or Firm*—Greenblum & Bernstein P.L.C.

[57] ABSTRACT

A lens barrel for holding an assembly or group of lens elements is molded as an integral member from a thermoplastic resin material such as polycarbonate, and at least two of the lens elements have different diameters. The lens barrel includes an outer cylindrical wall portion having a uniform diameter and a uniform wall thickness, and a lens holder portion integrally extending from an inner surface of the outer cylindrical wall portion. The lens holder portion is formed in accordance with the different diameters of the lens elements such that wall thickness is substantially uniform.

13 Claims, 5 Drawing Sheets

THERMOPLASTIC LENS BARREL FOR HOLDING ASSEMBLY OF LENS ELEMENTS

BACKGROUND OF THE INVENTION

1. Field of the Invention

The present invention relates to a lens barrel for holding an assembly or group of lens elements, which is used in optical reading devices such as telecopiers, image scanners, electrophotographic copying machines or the like.

2. Description of the Related Art

Such a lens barrel serves as a holder for an assembly or group of lens elements, and is usually formed of a suitable metal material, such as aluminium. The assembly or group of lens elements is previously assembled in the lens barrel, and this lens barrel is handled and shipped as an independent unit. Namely, the lens barrel having the assembly of lens elements assembled therein is manufactured as an independent product. The lens barrel holding the assembly of lens elements therein is incorporated into an optical reading device. In general, the lens barrel is provided with a cylindrical outer surface having a uniform diameter. Positioning the lens barrel is easily carried out to obtain an optimum focusing or orientation of the assembly of lens elements held therein during the installation of the lens barrel into the optical reading device.

In particular, the optical reading device includes a mount having a V-shaped groove formed therein, and the lens barrel is received in the V-shaped groove of the mount. A positional adjustment of the lens barrel is carried out by rotating the lens barrel in the V-shaped groove of the mount to obtain an optimum focusing or orientation of the assembly of lens elements held therein. After the optimum focussing or orientation of the assembly of lens elements is obtained, the lens barrel is secured in the V-shaped groove of the mount by suitable fastenings.

Developments in a manufacture of optical reading devices require the lens barrel to be molded from a thermoplastic material such as polycarbonate to reduce the production cost of the lens barrel. However, in order for the lens barrel to be molded of the thermoplastic materials some problems must be solved.

First, it is difficult to produce a thermoplastic lens barrel with a uniform diameter, because the lens elements included in the assembly thereof have different diameters. Namely, when the thermoplastic lens barrel is produced with a uniform diameters the peripheral wall of the thermoplastic lens barrel cannot have a uniform thickness due to the different diameters of the lens elements. Accordingly, in the molding of the lens barrel, shrink marks are produced on the surfaces of the molded lens barrel due to the irregular peripheral wall thickness thereof, deforming the molded lens barrel. Obviously, the deformed lens barrel can no longer be used as a holder for the assembly of lens elements.

It is possible to prevent the production of the shrink marks on the surfaces of the lens barrel by producing a peripheral wall of the lens barrel with a uniform thickness, so that the diameter of the lens barrel varies in accordance with the different diameters of the lens elements. In this case, however, the lens barrel does not have a uniform diameter, and the nonuniform barrel diameter makes it difficult to position the lens barrel in the optical reading device.

SUMMARY OF THE INVENTION

Therefore, an object of the present invention is to provide a lens barrel for holding an assembly or group of lens elements, which can be molded from a thermoplastic material such as polycarbonate, without producing shrink marks on the surfaces of the molded lens barrel and without the deformation of the molded lens barrel, and which is constituted in such manner that the lens barrel can be stably and rotatably received in a V-grooved mount of an optical reading device.

In accordance with a first aspect of the present invention, there is provided a lens barrel, for holding an assembly of lens elements, molded as an integral product from a resin material, with at least two of the lens elements having different diameters, the lens barrel comprising: an outer cylindrical wall portion having a uniform outer diameter and a uniform wall thickness; and a lens holder portion integrally extended from an inner surface of the outer cylindrical wall portion, the lens holder portion being constituted in accordance with the different diameters of the lens elements in such a manner that a wall thickness thereof is substantially uniform. The resin material may be a thermoplastic resin material.

In the first aspect of the present invention, the lens holder portion may be integrally projected radially and inwardly from a circular section of the inner wall surface of the outer cylindrical wall portion in the vicinity of an open end thereof, and may be then extended toward the other open end of the outer cylindrical wall portion.

Also, in the first aspect of the present invention, the lens holder portion may be integrally projected radially and inwardly from a central circular section of an inner wall surface of the outer cylindrical wall portion, and is then extended toward the two open ends of the outer cylindrical wall portion.

In the first aspect of the present invention, preferably, a wall thickness of the outer cylindrical wall portion is substantially equal to that of the lens holder portion.

In accordance with a second aspect of the present invention, there is provided a lens barrel, for holding an assembly of lens elements, molded as an integral product from a resin material, the assembly of lens elements comprising a first subgroup of lens elements, and a second subgroup of lens elements having smaller diameters than those of the lens elements included in the first subgroup, the lens barrel comprising: an outer cylindrical wall portion having a uniform outer diameter and a uniform wall thickness and having two open ends; and a lens holder portion disposed in an interior of the outer cylindrical wall portion and suspended therefrom, the lens holder portion being integrally projected radially and inwardly from a central circular section of an inner wall surface of the outer cylindrical wall portion, and being then extended toward the two open ends of the outer cylindrical wall portion, the lens holder portion including a small diameter section for holding the first subgroup of lens elements, and a large diameter section for holding the second subgroup of lens elements, the small and large diameter sections of the lens holder portion being constituted in accordance with the small and large diameters of the lens elements in such a manner that a wall thickness of the small and large diameter sections of the lens holder portion is substantially uniform. The resin material for forming the lens barrel may be a thermoplastic resin material.

In the second aspect of the present invention, preferably, a wall thickness of the outer cylindrical wall portion is substantially equal to that of the lens holder portion.

In accordance with third aspect of the present invention, there is provided a lens barrel, for holding an assembly of lens elements, molded as an integral product from a resin material, with at least two of the lens elements having different diameters, the lens barrel comprising a cylindrical body including two annular sections having a same outer diameter, and a lens holder section provided therebetween for holding the assembly of lens elements, the lens holder section being constituted in accordance with the different diameters of the lens elements in such a manner that a wall thickness thereof is substantially uniform, the outer diameter of the annular sections being larger than that of the lens holder section. The resin material for forming the lens barrel may be a thermoplastic resin material. Preferably, the annular sections are formed as end portions of the cylindrical body.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
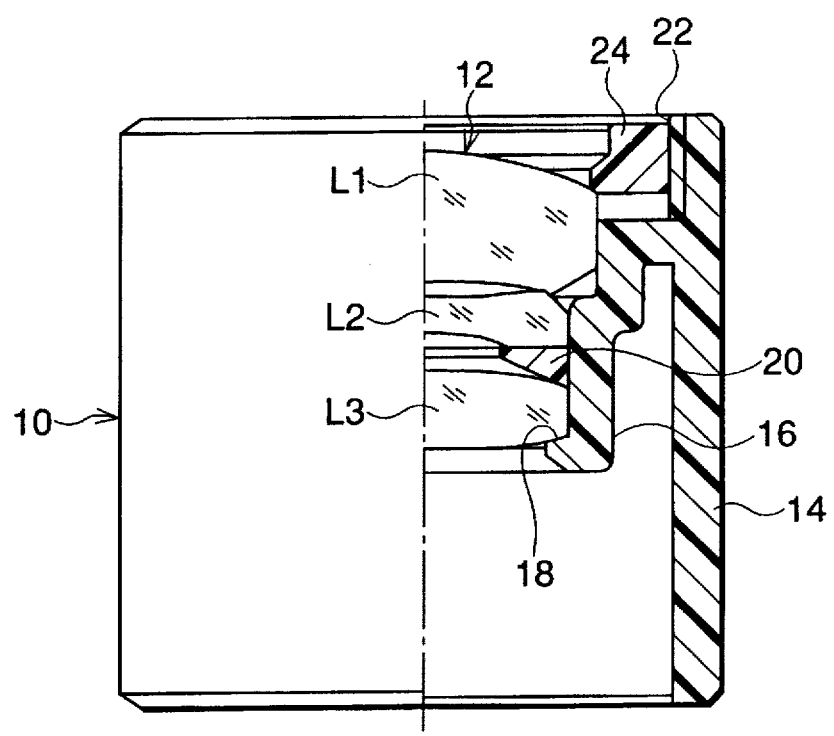
FIG. 1 is a partial longitudinal cross-sectional view showing a first embodiment of a lens barrel according to the present invention.

FIG. 1 shows a first embodiment of a lens barrel according to the present invention, generally indicated by reference numeral 10. An assembly of lens elements, indicated by reference numeral 12, is assembled in the lens barrel 10. In this first embodiment, the lens assembly 12 includes three lens elements: a first lens element L1; a second lens element L2; and a third lens element L3. A diameter of the first lens element L1 is larger than that of the second and third lens elements L2 and L3, which have the same diameter.

The lens barrel 10 is integrally molded from a suitable thermoplastic resin material such as polycarbonate, and includes an outer cylindrical wall portion 14, and an inner cylindrical wall portion 16 concentrically disposed in an interior of the outer cylindrical wall portion 14 and suspended therefrom. In particular, the inner cylindrical wall portion 16 is integrally projected radially and inwardly from a circular section of an inner wall surface of the outer cylindrical wall portion 14 in the vicinity of one open end thereof, and is then extended toward the other open end of the outer cylindrical wall portion 14.

As is apparent from FIG. 1, the inner cylindrical wall portion 16 per se serves as a lens holder for holding the assembly 12 of lens elements L1, L2, and L3, and is supported by and suspended from the outer cylindrical wall portion 14 having a uniform diameter and a uniform wall thickness.

The inner cylindrical wall portion or lens holder portion 16 has a diameter varying in accordance with the diameters of the first, second, and third lens elements L1, L2, and L3 forming the lens assembly 12. In particular, a section of the lens holder portion 16 for holding the first lens element L1 has a larger diameter than that of the other section thereof for holding the second and third lens elements L2 and L3 such thickness is given to the lens holder portion 16.

Thus, when the lens barrel 10 is molded from the thermoplastic resin material, shrink marks are not produced on the surfaces of the lens barrel 10, lens barrel 10 is thus free of deformations. Namely, according to the present invention, the lens barrel can be produced to highly accurate dimensions.

Preferably, the lens barrel 10 is designed such that the radial wall thickness of the outer cylindrical wall portion 14 is equal to that of the inner cylindrical wall portion or lens holder portion 16. In this case, not only does this prevent shrink marks on the surfaces of the lens barrel 10, but it also minimizes thermal deformation of the lens barrel 10 caused by the thermal expansion thereof.

When the assembly 12 of lens elements L1, L2, and L3 is assembled in the lens holder portion 16 of the lens barrel 10, the third lens element L3 is first inserted into the small diameter section of the lens holder portion 16 to about an annular flange element 18 formed around an inner edge of an free open end of that small diameter section. An annular spacer 20 is then inserted into the small diameter section of the lens holder portion 16 and placed into the third lens element L3. Further, the second lens element L2 is inserted into the lens holder portion 16 to abut against the annular spacer 20. The first lens element L1 is then received in the large diameter section of the lens holder portion 16, and is rested onto the second lens element L2.

The outer cylindrical wall portion 14 has inner female threads 22 formed in a section of the inner wall surface thereof between the circular section from which the inner cylindrical portion 14 is projected and the open end thereof which is in the vicinity of that circular section. After the first lens element L3 is rested onto the second lens element L2, a retaining ring member 24 having male threads formed therearound is screwed into the female threads 22, such that the lens elements L1, L2, and L3 and the annular spacer 20 are pressed against each other, whereby the assembly 12 of lens elements L1, L2, and L3 is securely held in the inner cylindrical wall portion or lens holder portion 16.

Figure 2:
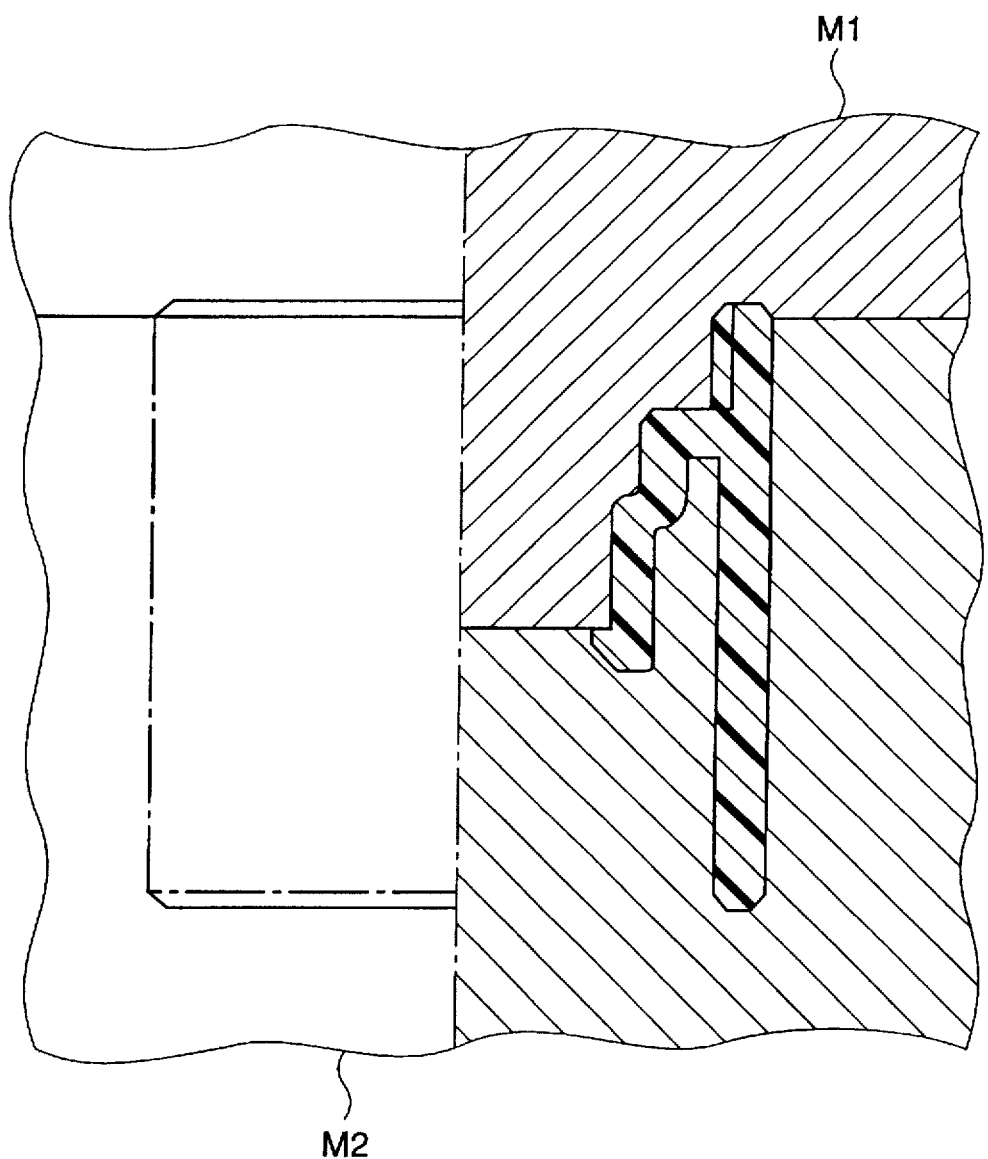
FIG. 2 is a partial longitudinal cross-sectional view showing the lens barrel of FIG. 1 together with two mold elements for molding the same.

As shown in FIG. 2, the lens barrel 10 can be molded by using only two mold elements M1 and M2. Of course, the smaller the number of mold elements, the lower the cost of production of lens barrels.

Figure 3:
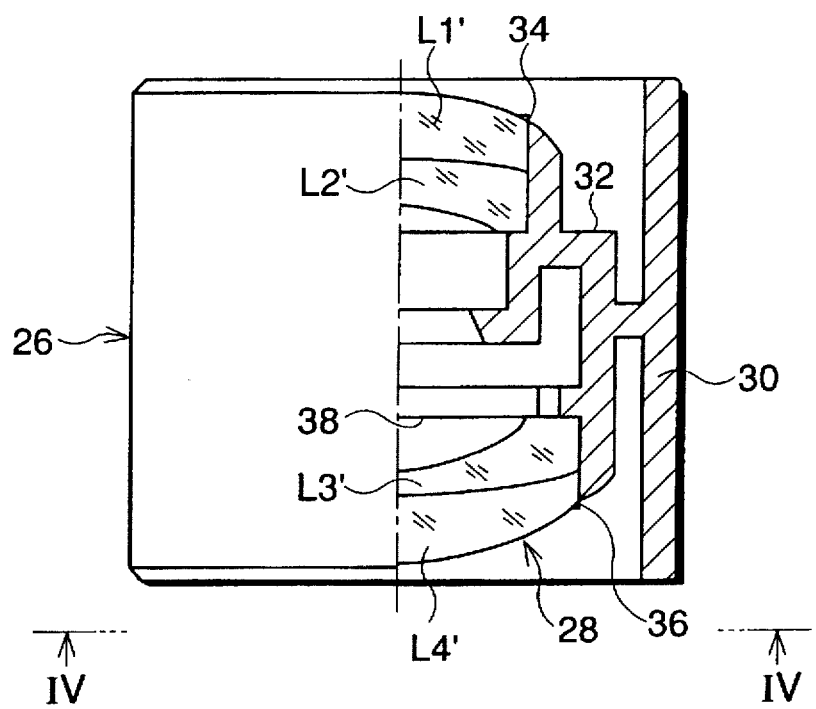
FIG. 3 is a partial longitudinal cross-sectional view showing a second embodiment of a lens barrel according to the present invention.
Figure 4:
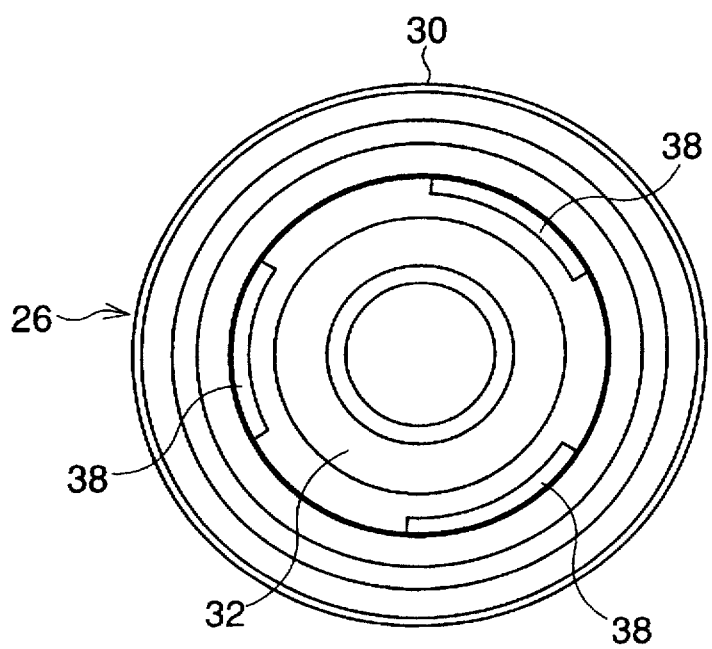
FIG. 4 is an end view observed along the line IV—IV of FIG. 3.

FIGS. 3 and 4 show a second embodiment of the lens barrel according to the present invention. In these drawings, the lens barrel is generally indicated by reference numerals 26, and is designed to hold an assembly or group 28 of lens elements L1', L2', L3', and L4'. The lens elements L1' and L2' have the same diameter, while the lens elements L3' and L4' have the same diameter; the diameter of the former is smaller than that of the latter.

As in the case of the first-mentioned embodiment, the lens barrel 26 is integrally molded from a suitable thermoplastic resin material such as polycarbonate, and includes an outer cylindrical wall portion 30, and an inner cylindrical wall portion 32 concentrically disposed in an interior of the outer cylindrical wall portion 30 and suspended therefrom. In particular, the inner cylindrical wall portion 32 integrally projects radially and inwardly from a central circular section of an inner wall surface of the outer cylindrical wall portion 30, and is extends toward the open ends of the outer cylindrical wall portion 30. As is apparent from FIG. 3, the inner cylindrical wall portion 32 per se serves as a lens holder for holding the assembly 28 of lens elements L1', L2', L3', and L4', and is supported by and suspended from the outer cylindrical wall portion 30 having a uniform outer diameter and a uniform wall thickness.

The inner cylindrical wall portion or lens holder portion 32 includes two sections: one section having a small diameter for accommodating the lens elements L1' and L2'; and the other section having a large diameter for accommodating the lens elements L3' and L4'. Namely, the lens holder portion 32 is designed in accordance with the different diameters of the lens elements L1' and L2' and the lens elements L3' and L4' such that the wall thickness of the lens holder portion 32 is uniform.

Thus, as in the case of the first-mentioned embodiment, when the lens barrel 26 is molded from the thermoplastic resin material, shrink marks are not produced on the surfaces of the lens barrel 26, and the lens barrel 26. The lens barrel 26 can thus have highly accurate dimensions.

Preferably, the lens barrel 26 is designed such that the wall thickness of the outer cylindrical wall portion 30 is equal to that of the inner cylindrical wall portion or lens holder portion 32. In this case, not only are shrink marks prevented, but thermal deformation of the lens barrel 26 caused by the thermal expansion thereof is minimized.

In assembling the assembly 28 of lens elements L1', L2', L3', and L4' in the lens holder portion 32 of the lens barrel 26, for example, a subgroup of lens elements L1' and L2' is placed in the small diameter section of the lens holder portion 32. The lens elements L1' and L2' are securely fixed in the small diameter section by thermally fusing a material having an annular edge of an outer end face thereof, as indicated by reference numeral 34. A subgroup of lens elements L3' and L4' is then placed in the large diameter section of the lens holder portion 32. The lens elements L3' and L4' are securely fixed in the large diameter section by thermally fusing a material having an annular edge of an outer end face thereof, as indicated by reference numeral 36.

As is apparent from FIGS. 3 and 4, the lens element L3 received in the large diameter section of the lens holder portion 32 abuts against, and is supported by three arced flange elements 38 integrally formed therewith. The three shoulder elements 38 are spaced around the circumference of lens holder portion 32 at regular intervals. Each of the shoulder elements 38 has a shorter arc length than that of the arcuate spaces between two adjacent shoulder elements 38.

With this arrangement of the flange elements 38, after molding the lens barrel 26, an inner mold element (not shown) for molding the inner profile of the large diameter section of the lens holder portion 32 can be easily removed by relatively rotating the inner mold element with respect to the lens barrel 26. Namely, the arrangement of the shoulder elements 38 contributes to the reduction in the number of mold elements required to mold the lens barrel 26.

Figure 5:
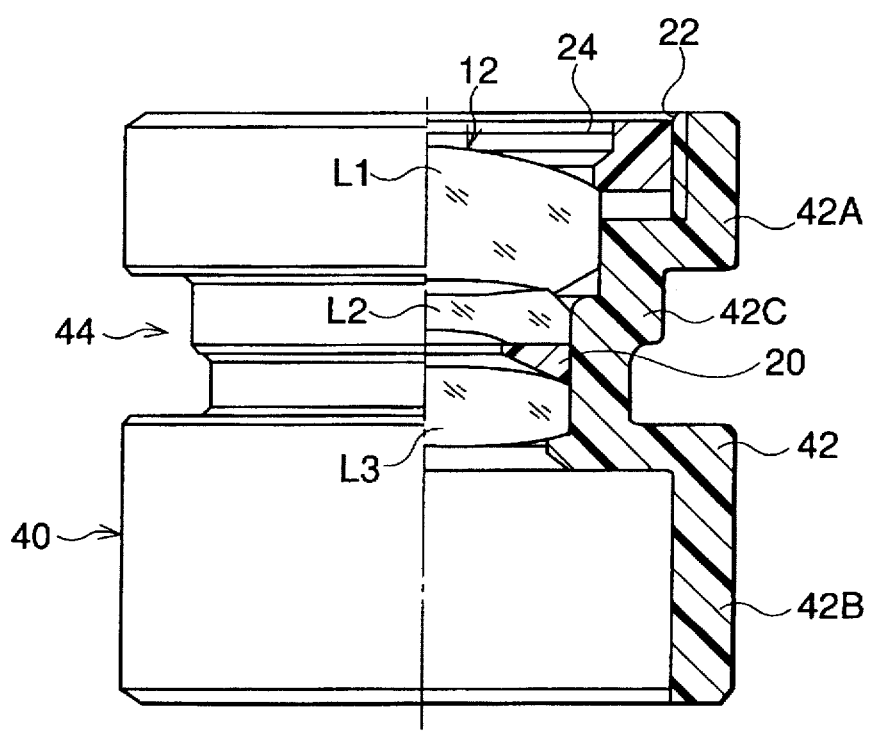
FIG. 5 is a partial longitudinal cross-sectional view showing a third embodiment of a lens barrel according to the present invention shown in FIG. 1.

FIG. 5 shows a third embodiment of a lens barrel according to the present invention, generally indicated by reference numeral 40. This lens barrel 40 is constituted so as to hold an assembly, of lens elements L1, L2, and L3, which is identical with that shown in FIG. 1. In FIG. 5, the features similar to those of FIG. 1 are indicated by the same reference numerals.

In this third embodiment, the lens barrel 40 comprises a cylindrical body 42, which is integrally molded from a thermoplastic resin material such as polycarbonate. The cylindrical body 42 includes two sections 42A and 42B having the same outer diameter, and a lens holder section 42C provided therebetween for holding the assembly 12 of lens elements L1, L2, and L3.

The lens holder section 42C is constituted in accordance with the different diameters of the lens elements L1, L2, and L3 such that a wall thickness thereof is substantially uniform. Namely, an outer diameter of the lens holder section 42C is varied in accordance with the different diameters of the lens elements L1, L2, and L3, to thereby ensure the uniform wall thickness thereof. Also, in the third embodiment, the wall thickness of the annular sections 42A and 42B is substantially equal to that of the lens holder sections 42C, and the outer diameter of the annular sections 42A and 42B is larger than that of the lens holder section 42C.

Accordingly, similar to the first and second embodiments as mentioned above, when the lens barrel 40 is be molded from the thermoplastic resin material, shrink marks are not produced on the surfaces of the lens barrel 40, and the lens barrel 40 is free from deformations. The lens barrel 40 can be produced with highly accurate dimensions.

In the third embodiments although the lens barrel 40 cannot be given uniform diameter at the expense of uniform wall thickness thereof, the lens barrel 40 can be stably and rotatably received in a V-grooved mount of an optical reading device due to the same diameter of the annular sections 42A and 42B of the cylindrical body 42. Namely, a positional adjustment of the lens barrel 40 is carried out by rotating the lens barrel 10 in the V-grooved mounts whereby an optimum focusing or orientation of the assembly 12 of lens elements L1, L2, and L3 can be obtained.

Figure 6:
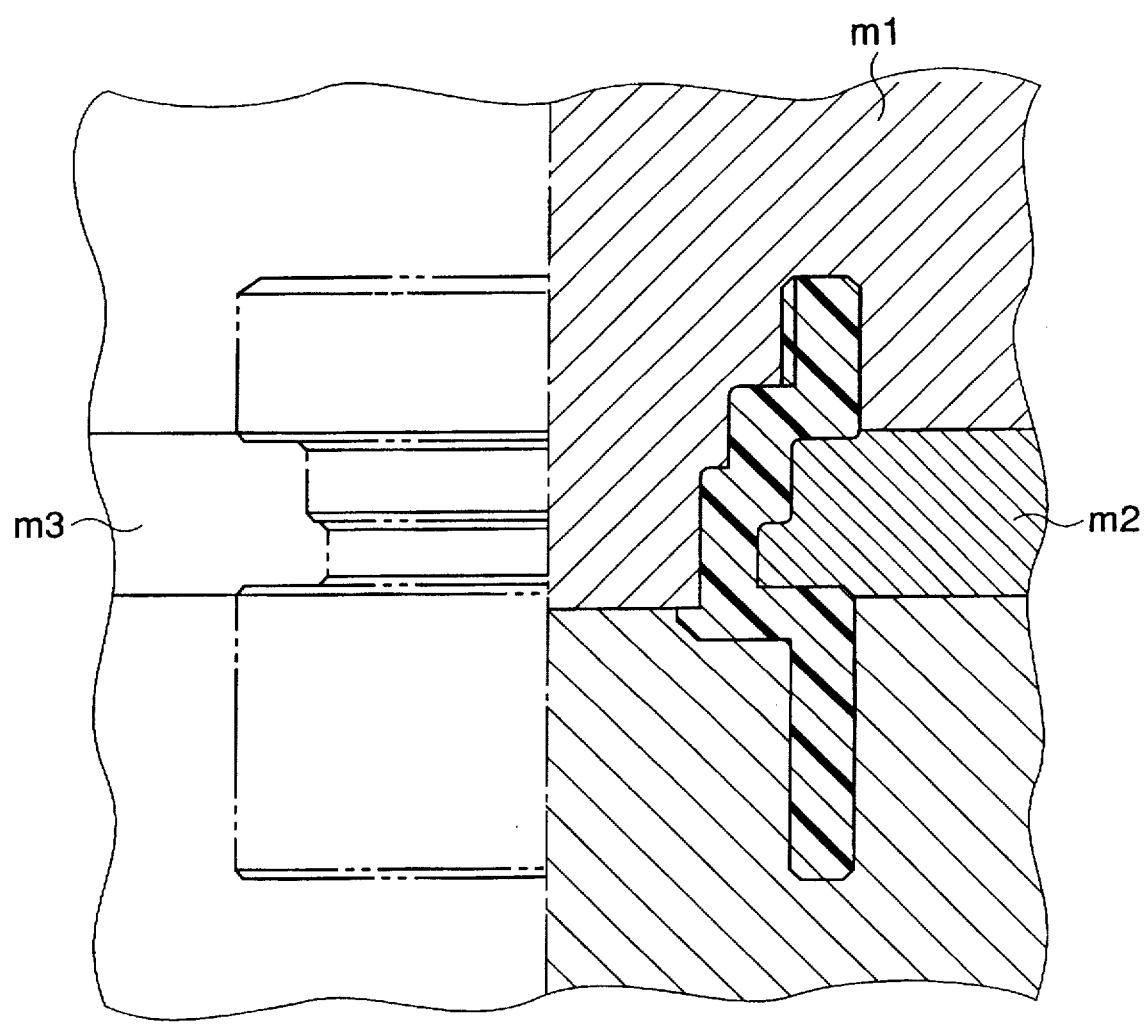
FIG. 6 is a partial longitudinal cross-sectional view showing the lens barrel of FIG. 5 together with four mold elements for molding the same.

As shown in FIG. 6, four mold elements m1, m2, m3, and m4 are preferably used to mold the lens barrel 40 due to an annular recess 26 formed between the annular sections 42A and 42B. In this regard, the first embodiment shown in FIG. 1 is superior to the third embodiment shown in FIG. 5.

Note that, in the third embodiment, the annular sections 42A and 42B are formed as the end portions of the cylindrical body 42 for the greatest stability when mounted. However, the annular sections 42A and 42B do not necessarily form the end portions.

As is apparent from the aforementioned description, according to the present invention, not only is the lens barrel to to be made of an inexpensive thermoplastic resin material such as polycarbonate, but the lens barrel can also be produced with highly accurate dimensions.

Finally, it will be understood by those skilled in the art that the aforementioned description is of preferred embodiments of the present invention, and that various changes and modifications may be made to the present invention without departing from the spirit and scope thereof.

The present disclosure relates to subject matter contained in Japanese Patent Application No. 7-242512 (filed on Aug. 28, 1995), which is expressly incorporated herein, by reference, in its entirety.

I claim:

1. A lens barrel, for holding an assembly of lens elements, molded as an integral member from a resin material, with at least two of the lens elements having different diameters, said lens barrel comprising:

an outer cylindrical wall portion having a uniform outer diameter and a uniform wall thickness; and a lens holder portion integrally extending from an inner wall surface of said outer cylindrical wall portion, said lens holder portion being formed with said different diameters of said lens elements, such that a wall thickness is substantially uniform.

2. A lens barrel as set forth in claim 1, wherein said resin material is a thermoplastic resin material.

3. A lens barrel as set forth in claim 1, wherein said wall thickness of said outer cylindrical wall portion is substantially equal to said wall thickness of said lens holder portion.

4. A lens barrel as set forth in claim 1, wherein said outer cylindrical wall portion has two open ends, said lens holder portion integrally projecting radially and inwardly from a circular section of the inner wall surface of said outer cylindrical wall portion in the vicinity of one end of said two open ends, and extending toward the other end of said two open ends of said outer cylindrical wall portion.

5. A lens barrel as set forth in claim 4, wherein said wall thickness of said outer cylindrical wall portion is substantially equal to said wall thickness of said lens holder portion.

6. A lens barrel as set forth in claim 1, wherein said outer cylindrical wall portion has two open ends, said lens holder portion integrally projecting radially and inwardly from a central circular section of an inner wall surface of said outer cylindrical wall portion, and extending toward the two open ends of said outer cylindrical wall portion.

7. A lens barrel as set forth in claim 6, wherein said wall thickness of said outer cylindrical wall portion is substantially equal to said wall thickness of said lens holder portion.

8. A lens barrel, for holding an assembly of lens elements, molded as an integral member from a resin material, said assembly of lens elements comprising a first subgroup of lens elements, and a second subgroup of lens elements having diameters larger than the diameters of the lens elements of said first subgroup, said lens barrel comprising:

an outer cylindrical wall portion having a uniform outer diameter, a uniform wall thickness, and having two open ends; and a lens holder portion disposed in an interior of the outer cylindrical wall portion and suspended therefrom, said lens holder portion integrally projecting radially and inwardly from a central circular section of an inner wall surface of said outer cylindrical wall portion, and extending toward the two open ends of said outer cylindrical wall portion, said lens holder portion including a small diameter section for holding said first subgroup of lens elements, and a large diameter section for holding said second subgroup of lens elements, the small and large diameter sections of said lens holder portion being formed in accordance with the diameters of said lens elements such that wall thickness of the small and large diameter sections of said lens holder portion is substantially uniform.

9. A lens barrel as set forth in claim 8, wherein said resin material is a thermoplastic resin material.

10. A lens barrel as set forth in claim 8, wherein said wall thickness of said outer cylindrical wall portion is substantially equal to said wall thickness of said lens holder portion.

11. A lens barrel, for holding an assembly of lens elements, molded as an integral member from a resin material, with at least two of the lens elements having different diameters, said lens barrel comprising a cylindrical body including at least two annular sections having a same outer diameter, and a lens holder section provided between said two annular sections for holding said assembly of lens elements, said lens holder section being formed in accordance with the different diameters of said lens elements such that a wall thickness is substantially uniform, the outer diameter of said annular sections being larger than the outer diameter of said lens holder section.

12. A lens barrel as set forth in claim 11, wherein said resin material is a thermoplastic resin material.

13. A lens barrel as set forth in claim 11, wherein said annular sections are formed as end portions of said cylindrical body.

* * * * *